Patented Mar. 23, 1954

2,673,160

UNITED STATES PATENT OFFICE 2,673,160

METHOD OF PRESERVING SHELL EGGS

Robert E. Feeney, Berkeley, Amon H. Brown, El Cerrito, and Leonard R. MacDonnell, Richmond, Calif., assignors to the United States of America as represented by the Secretary of Agriculture No Drawing. Application May 21, 1951, Serial No. 227,502

4 Claims. (Cl. 99—161)

(Granted under Title 35, U. S. Code (1952), sec. 266)

The invention herein described may be manufactured or used by or for the Government of the United States of America for governmental purposes throughout the world without the payment to us of any royalty thereon.

This invention relates to the preservation of shell eggs. In particular, the prime object of this invention is to provide a process for treating shell eggs to reduce their susceptibility to microbial spoilage thus to produce eggs which will maintain their quality for much longer periods of time than will ordinary, untreated eggs.

It is well known that one of the primary causes of deterioration of shell eggs on storage is due to the action of micro-organisms. The surface of eggs is always contaminated with adventitious organisms and upon storage these organisms tend to penetrate the porous shell and cause souring or other deteriorative changes of the egg material. Various factors may increase the rate of spoilage. Thus washing of shell eggs tends to cause transfer of organisms through the shell whereby the organisms tend to multiply more rapidly. High storage temperatures also tend to increase the rate of microbial spoilage. Another factor to be considered is that humidity accelerates microbial spoilage. Thus, when eggs are removed from cold storage, dew collects on their surfaces providing ideal conditions for microbial growth. Further, under conditions of high humidity, microbial growth and spoilage will take place even at cold storage temperatures.

The problem of microbial spoilage has been long recognized in the industry and many methods for controlling it have been advocated. One technique is to dip the shell eggs in a germicidal solution. Such treatments, if carried out properly, are effective in destroying micro-organisms on the surface of the shell but have several disadvantages, the foremost of which is that the germicide may penetrate the shell and contaminate the edible portion of the egg. Another technique involves dipping the shell eggs into a bath of water at a temperature from 140°–212° F. and keeping them in the bath for varying periods of time. This type of treatment also has several disadvantages. The foremost is that heat transfer is relatively slow due to the low temperature gradient and when the heat treatment is continued long enough to destroy the micro-organisms, the edible portion of the egg may also be deleteriously altered; the white tends to become at least partially coagulated and has decreased foaming properties. Another disadvantage of using an aqueous heating medium is that the water may transport micro-organisms from the outside of the shell into and through the shell where the degree of heat may not be sufficient to destroy them. Another disadvantage of using an aqueous medium is that in plant practice, the medium rapidly becomes fouled with debris, micro-organisms, contents of broken eggs, etc. until it becomes a contaminating rather than a de-contaminating medium.

We have now found that the disadvantages of the prior art may be avoided by applying to the shell eggs a dry, intensely hot medium for a very short interval of time and then immediately cooling the eggs. In general, the heating medium is at a temperature from about 700° C. to about 2000° C. and is applied for a period of time sufficient to destroy the micro-organisms. The time necessary for such action to take place will vary with the temperature of the medium, the higher temperatures requiring a shorter period of time and vice versa. In general the heating medium is applied for from about ½ to about 5 seconds. In most cases a heating time of about 1–3 seconds is preferred. By applying this intensely hot medium to the eggs the micro-organisms present on the shell, in the shell, and on the inner surface of the shell can be rapidly destroyed whereas the brief heating time does not result in any substantial rise in temperature of the edible portion of the eggs nor any deterioration thereof. Thus we have broken out eggs immediately after the heat treatment and measured the temperature of the edible material and found it to be only about 2° C. above the original temperature prior to the heat treatment. In the preferred embodiment of our invention, the shell eggs are flamed, that is, a flame of burning artificial or natural gas is impinged directly on the surface of the eggs. To secure the best results the entire surface of the eggs should be subjected to the flame. To this end, the eggs should be rotated in the flame or the flame may be suitably moved about to sweep it across the entire surface of the egg. For small-scale operations we have found it convenient to place the eggs in clamps made of nichrome or other heat-resistant metal and rotate in the flame with a tipping motion to ensure that the ends as well as the other surfaces are thoroughly flamed. For large-scale operations the eggs may be carried on a continuous chain conveyor made of a suitable heat-resistant metal and continuously passed through a zone which is subjected to flames from above and below as well as both sides. The flames may be supplied by a glass-blower's burner which consists of a toroidal pipe through which the inflammable gaseous mixture is passed, this pipe being provided with a series of ports about the inner circumference of the torus thus providing a circle of flames about this inner circumference. Instead of a chain conveyor, the eggs may be transported on a series of screw conveyors which would move them through the heating zone as well as rotate them continuously. Other mechanical devices may be used to rotate the eggs or otherwise move them about to expose all their surfaces to the heating medium. Instead of employing a flame as the heating medium, one can expose the eggs to the radiant heat of an incandescent body. Thus, for example, the eggs may be passed with a rotary motion through the interior of a metal or ceramic pipe which is maintained at incandescence by application of a suitable heating device such as electrical heating elements or burning gases or other fuels. Regardless of how the heating is done, after the heating period the eggs should be immediately cooled. This is accomplished most easily by contacting them with air at room temperature until they are cool. The cooling may be expedited by blowing cool air over the eggs. After the eggs have been heat-treated and cooled they are ready for storage or use.

Although our process is particularly aimed at increasing the storage life of shell eggs, it is also advantageously applied where storage is not involved. Thus our process may be applied as a pretreatment in all instances where shell eggs are broken out and the liquid egg material is used immediately or is subjected to various processing steps such as drying, freezing, and so forth. The point is that in the process of breaking out shell eggs, the micro-organisms on the shells are an important cause of contamination of the liquid egg material obtained thereby. To greatly reduce such contamination, our process as described herein may be applied to the shell eggs just prior to the egg breaking operation. Thus, regardless of the final use of the liquid egg, shell eggs may be subjected to our rapid, high-intensity heat treatment whereby to greatly reduce the amount of contamination introduced into the edible egg material during the egg breaking procedure.

Some of the advantages of our process are as follows:

The heat treatment is very rapid, requiring at most only a few seconds to destroy the microbial flora on the outer components of the shell eggs.

The process has no deleterious effect on the edible part of the eggs thus the edible portions retain their natural odor, flavor, and appearance.

The rapid, high intensity heat treatment does not cause any discoloration of the shells or contents. Further, the shell and shell membrane are not injured or otherwise adversely affected. Therefore the products do not exhibit increased rates of evaporation of moisture.

The following experiments demonstrate the invention in greater detail. It is understood that these examples are furnished only by way of illustration and not limitation.

In Example I, the eggs were deliberately infected with *Pseudomonas fluorescens*. This was done in order to demonstrate the sterilizing effect of the heat treatment. It is obvious that in practice no organisms of any kind would be applied to the eggs.

EXAMPLE I

Thirty-six fresh shell eggs were allowed to stand overnight at room temperature. The next day these eggs were contaminated by placing them in a bath of cold water (10° C.) to which had been added a 24-hour culture of *Pseudomonas fluorescens*—an organism isolated from sour eggs and which grows under cold storage conditions. The eggs were allowed to stand in the bath for ½ hour then removed and allowed to dry in air for 6 hours. Twenty-four of the eggs were then flamed by rotating them in the flame of a glass-blower's burner (about 1200°–1500° C.) fed with natural gas and compressed air. Twelve of the eggs were flamed for 3 seconds and the other twelve were flamed for 5 seconds. Immediately after the heating the eggs were allowed to stand in air until cool. The 24 eggs which had been heat treated plus the 12 eggs (control) which had been infected but not heat treated were all stored at 15° C.—the optimum growth temperature for *Ps. fluorescens*. At intervals, the eggs were examined under an ultraviolet lamp to detect fluorescence, the presence of fluorescence indicating the growth of the pseudomonas organism since it elaborates a fluorescent pigment. At each examination the number of fluorescent eggs in each batch was noted. The results are summarized in the following table.

Table 1

| Storage period, weeks | Number of fluorescent eggs | | |
|---|---|---|---|
| | Control, no heat treatment | 3-second heat treatment | 5-second heat treatment |
| 1 | 0 | 0 | 0 |
| 2 | 0 | 0 | 0 |
| 3 | 4 | 0 | 0 |
| 4 | 5 | 0 | 0 |
| 5 | 6 | 0 | 0 |
| 6 | 8 | 0 | 0 |

From the above data, it is evident that after 6 weeks of storage, 8 out of 12 eggs in the control batch showed evidence of microbial spoilage whereas none of the heat-treated eggs showed any microbial spoilage.

EXAMPLE II

Three dozen fresh shell eggs were procured. Of these, 2 dozen were flamed and cooled by the technique set forth in Example I. One dozen were flamed for 2 seconds and one dozen for 3½ seconds.

The heat-treated eggs as well as the untreated (control) eggs were subjected to accelerated storage conditions, i. e., 90° F. for 23 days. At the end of this period the eggs were examined and analyzed for quality. It was noted that there was no significant difference in weight loss between the untreated and the treated eggs. This indicates that the heat treatment did not significantly damage the shells or shell membranes in a manner which would be reflected in a large weight loss due to increased rate of evaporation of moisture from the edible egg material. The proportion of thick white in each batch of eggs was determined, the original proportion of thick white being 65%. After storage, it was found that the untreated eggs had an average of 6% thick white whereas the eggs flamed for 2 seconds contained an average of 8% thick white and the eggs flamed for 3½ seconds contained an average of 20% thick white. These data indicate that the flame treatment in no way increases the rate of the deteriorative reaction which causes thinning of the egg white and may under certain conditions, decrease the rate.

Having thus described our invention, we claim:

1. A process for preserving shell eggs which comprises subjecting the entire surface of shell eggs to a dry heating medium at a temperature from about 700° C. to 2000° C. for a period of time from about ½ to 5 seconds to destroy any microbial flora existing on the said surface without adversely affecting the shells and edible portion of the eggs, immediately cooling the heat-treated eggs, and storing, without further preservation treatment, them.

2. The process of claim 1 wherein the dry heating medium is an impinging flame.

3. The process of claim 1 wherein the dry heating medium is an impinging flame, the temperature ranges from 1200° C. to 1500° C., and the time of heating is from about 1 to 3 seconds.

4. A process for preserving shell eggs which consists of subjecting the entire surface of shell eggs to a dry heating medium at a temperature from about 700° C. to 2000° C. for a period of time from about ½ to 5 seconds to destroy any microbial flora existing on the said surface without adversely affecting the shells and edible portion of the eggs, immediately cooling the heat-treated eggs and storing them.

ROBERT E. FEENEY.
AMON H. BROWN.
LEONARD R. MacDONNELL.

References Cited in the file of this patent

UNITED STATES PATENTS

| Number | Name | Date |
|---|---|---|
| 1,272,750 | Wilson | July 16, 1918 |
| 2,159,027 | Jalma et al. | May 23, 1939 |
| 2,198,209 | Musher | Apr. 23, 1940 |
| 2,223,813 | Brown | Dec. 3, 1940 |
| 2,283,290 | Savage | May 19, 1942 |

FOREIGN PATENTS

| Number | Country | Date |
|---|---|---|
| 11,178 | Great Britain | June 3, 1904 |